(No Model.)
W. K. HOMER.
PIPE COUPLING NIPPLE.
No. 463,755.　　　　　　Patented Nov. 24, 1891.
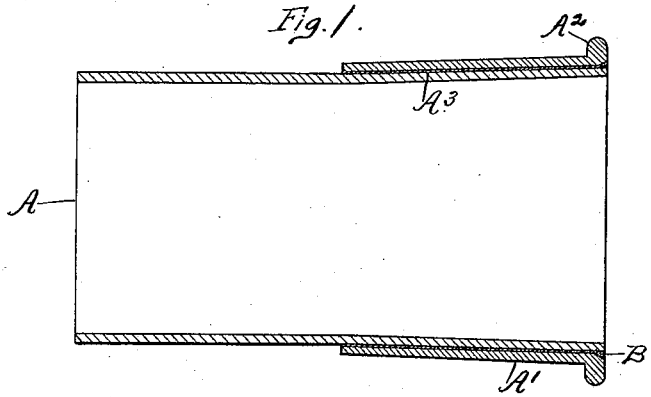
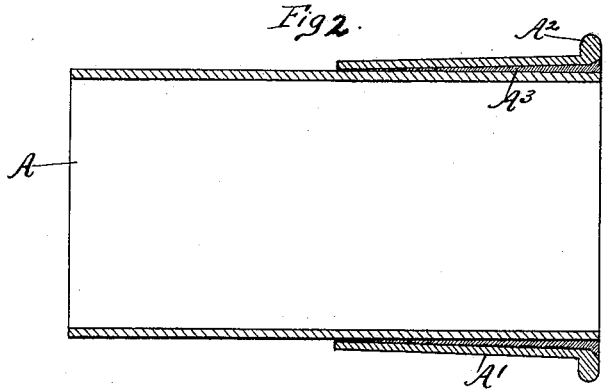
Witnesses:
Frank C. Curtis
Edw. H. Hollister Jr.
Inventor:
William K. Homer
by Geo. A. Mosher
Atty.

UNITED STATES PATENT OFFICE.

WILLIAM K. HOMER, OF LANSINGBURG, NEW YORK.

PIPE-COUPLING NIPPLE.

SPECIFICATION forming part of Letters Patent No. 463,755, dated November 24, 1891.

Application filed February 20, 1891. Serial No. 382,170. (No model.)

*To all whom it may concern:*

Be it known that I, WILLIAM K. HOMER, a citizen of the United States, residing at Lansingburg, county of Rensselaer, and State of New York, have invented certain new and useful Improvements in Pipe-Coupling Nipples, of which the following is a specification.

My invention relates to such improvements; and it consists of the novel construction and combination of parts hereinafter described and subsequently claimed.

Reference may be had to the accompanying drawings and the letters of reference marked thereon, which form a part of this specification.

Similar letters refer to similar parts in the several figures therein.

Figure 1 of the drawings is a central longitudinal section of my improved pipe-coupling nipple. Fig. 2 is a similar view showing the method of construction.

My invention relates to that class of coupling-nipples employed to connect a soft-metal pipe, as lead pipe, with iron soil-pipe, in which the joints are required to be gas-tight, and are generally formed by compacting lead or other soft metal about the same with a cold-chisel and hammer, in a manner well known to those skilled in the art. Lead pipe is of such a pliable yielding nature that the compacting blows would reduce it to a shapeless and useless mass, unless protected by a sleeve or ferrule of less pliable metal, as iron.

Various means have been heretofore employed to apply such a sleeve to the lead pipe. If the iron sleeve is placed inside the pipe, it quickly corrodes and renders the joint defective. When placed outside the lead pipe, as heretofore practiced, the unequal expansion and contraction of the metals separates them to such a degree as to permit the escape of the inclosed gases. Nipples have been formed by casting a lead pipe about an iron ferrule so as to wholly inclose the iron ferrule with the leaden wall of the cast pipe; but such form of construction is expensive and difficult to manufacture.

My improved nipple consists of a piece of common lead pipe A, secured within an iron sleeve or ferrule A', having the peripheral flange $A^2$ at one end, by means of the fusible solder $A^3$—that is, solder that will fuse at a temperature lower than the melting-point of lead. The inner surface of the iron ferrule is first tinned, so that solder will unite with it. One end of the lead pipe is then inserted within the ferrule, which is of a size large enough to receive it, and the pipe and ferrule heated above the fusing-point of the solder. The lead pipe and tinned ferrule are then united or soldered together by filling the space between the pipe and ferrule with the fused solder and allowing the parts to cool. When desired, the inner surface of the ferrule may be beveled at one end, as shown at B in Fig. 1, to facilitate the entrance of the solder into the space between the pipe and ferrule. The ferrule is tapered from one end to the other, so as to present an enlarged opening at one end, as shown in Fig. 2, thus forming a larger space for the fusible solder between the pipe and ferrule, and the lead pipe expanded by means of a plug in the usual well-known manner, while the solder is in a state of fusion, to insure filling the whole space between the pipe and ferrule with solder. The relative position of the pipe, solder, and tapered ferrule before the pipe is expanded is shown in Fig. 2, and the position of the same parts after the pipe is expanded is shown in Fig. 1. I am thus able to form a metallic union between the lead pipe and the iron ferrule throughout the length of the latter that will not be broken by the expansion and contraction of the two metals and that will be impervious to gases.

Although I do not wish to be limited to the use of solder fusible at any particular degree of temperature below the fusing-point of lead, yet I prefer the use of solder that will fuse at about 212° Fahrenheit, or the boiling-point of water.

The function of the ferrule being to strengthen the pipe, other hard metals may be substituted for iron in the ferrule when desired, and other soft metals may be substituted for lead in the pipe.

I am aware that a metallic union has been formed between a hard-metal ferrule and an inclosing soft-metal pipe by coating the ferrule with solder, bringing the coated surface of the ferrule into contact with the soft-metal pipe and fusing the solder by applying heat to the ferrule. The union so formed was imperfect, for the reason that the heat could be applied only through the ferrule, for if sufficient heat were applied to the pipe to melt the solder within, the pipe itself would be fused and rendered useless. When the temperature of the solder was raised to the fusing-point by applying heat to the inclosed ferrule, the temperature of the inclosing pipe would be considerably lower than that of the fused solder and an imperfect union only would take place between the solder and the inclosing pipe. By my improved method, wherein I make use of soft solder which fuses at a low temperature compared with lead pipe, I am easily able to raise the temperature of both pipe and ferrule above the fusing-temperature of the solder without injury to the soft-metal pipe, whereby the fused solder not only penetrates and fills the entire space between the pipe and ferrule but forms a perfect metallic union between them and the solder.

What I claim as new, and desire to secure by Letters Patent, is—

The herein-described method of forming a metallic union between a soft-metal pipe and a tapered pipe-inclosing hard-metal ferrule, which consists in heating the pipe and ferrule above the fusing-point of soft solder, filling the space between them throughout the length of the ferrule with soft solder fusible at a comparatively low temperature, and expanding the pipe while the solder is in a state of fusion.

In testimony whereof I have hereunto set my hand this 17th day of February, 1891.

W. K. HOMER.

Witnesses:
FRANK C. CURTIS,
CHAS. L. ALDEN.